United States Patent Office 3,284,348
Patented Nov. 8, 1966

3,284,348
AZEOTROPIC DISTILLATION OF HYDROCARBONS WITH HEXAFLUOROISOPROPYL ALCOHOL
David Glenn Hutton, Wilmington, Del., assignor to E. I. du Pont de Nemours and Company, Wilmington, Del., a corporation of Delaware
No Drawing. Filed Mar. 15, 1965, Ser. No. 439,972
6 Claims. (Cl. 208—348)

This invention relates to a new and improved process for separating non-aromatic hydrocarbons from their mixtures with aromatic hydrocarbons by azeotropic distillation.

The chemical and petroleum refining industries in recent years have been faced with increased demands for separating mixtures of hydrocarbons into fractions of different chemical types. The demand for high-purity benzene, toluene, xylenes, and ethyl-benzene for use in the production of dyes, plastics, and other chemical products has increased until it is beyond the potential capacity of the coal coking industry. As a result petrochemical sources for these aromatic chemicals have become important. Petroleum refiners have also had increased demands for gasolines which contain high concentrations of aromatic components of high octane number. They have also become interested in removing from gasoline stocks the non-aromatic components of low octane number for use as specialty solvents, for conversion into compounds of higher octane number, and for use as chemical intermediates.

Many different processes have been proposed for separating non-aromatic and aromatic hydrocarbons. Simple fractional distillation is not successful because of the closeness of non-aromatic and aromatic hydrocarbon boiling points and of the existence of azeotropes between aromatic and non-aromatic hydrocarbons.

It has been proposed to separate various hydrocarbon mixtures by azeotropic distillation, employing ketones, alcohols, acids, aldehydes, nitriles, and certain perfluoro compounds, e.g. perfluoro ethers, as azeotroping agents. Representative azeotroping agents, the processes for using them and the apparatus employed in such processes are described by K. H. Eisenlohr on pages 6–11 of his paper on "Production Of Pure Aromatics By Means Of Azeotropic Distillation And Extraction" presented at the 6th World Petroleum Congress, June 19–26, 1963, Section IV, Paper 8; by Hamlin in U.S. Patent 2,356,240; by Cines in U.S. Patents 2,602,093 and 2,692,227; and by Redlich et al. in U.S. Patent 2,684,935. In general, each azeotroping agent is disclosed to be useful for the separation of only particular hydrocarbon mixtures. For example, Hamlin, in U.S. Patent 2,356,240, discloses that isopropyl alcohol can be used to separate cyclohexane from benzene by azeotropic distillation. However, it is known that isopropyl alcohol forms azeotropes with such a variety of hydrocarbons, including both non-aromatic and aromatic hydrocarbons, that it cannot be used effectively for the general separation of mixtures of hydrocarbons into fractions of these different types by azeotropic distillation. On the other hand, 1,3-dichloro-2-propanol, for example, does not form azeotropes with typical non-aromatic hydrocarbons such as heptane and methylcyclohexane. Cines, in U.S. Patent 2,692,227, discloses that certain perfluoro compounds can be used to separate close boiling mixtures of straight chain paraffinic hydrocarbons from branched chain paraffinic hydrocarbons. Redlich et al. in U.S. Patent 2,684,935, disclose that certain perfluorocarboxylic acids can be used to separate mixtures of hydrocarbons of different degrees of saturation.

Also, azeotropic distillation with acetone has been proposed for the separation of n-heptane from benzene. Methyl alcohol, methyl ethyl ketone, and other azeotroping agents can be used for the purification of toluene fractions. A variety of other azeotroping agents have been proposed for the separation of xylenes from their mixtures. Few azeotroping agents are known, however, which are useful with hydrocarbon mixtures containing all the aromatic hydrocarbons ranging from benzene to ethylbenzene. Many of the agents considered also require that the mixture to be separated be given a preliminary hydrogenation or other treatment to remove olefinic hydrocarbons and other interfering materials present in even trace amounts.

It is an object of this invention to provide a new and improved process for the separation of non-aromatic hydrocarbons from their mixtures with aromatic hydrocarbons, which mixtures consist essentially of hydrocarbons normally boiling between 60° C. and 150° C., by azeotropic distillation with a novel azeotroping agent. Another object is to provide an azeotropic distillation process employing an azeotroping agent which is particularly adapted for use with petroleum products that are composed predominantly of hydrocarbons of 6–8 carbon atoms, including both non-aromatic hydrocarbons and aromatic hydrocarbons, and which process can be controlled so as to separate all or any desired proportion of the non-aromatic hydrocarbons from the mixture, which separated non-aromatic hydrocarbons contain little or no aromatic hydrocarbons. A further object is to provide an azeotropic distillation process of the above character that employs an azeotroping agent which is highly soluble in water and which can be readily and economically separated from the hydrocarbons and from water and recovered for reuse in the azeotropic distillation of additional amounts of the hydrocarbon mixtures. Other objects are to advance the art. Still other objects will appear hereinafter.

The above and other objects can be accomplished by means of this invention, particularly by the process which comprises (a) Distilling in a distillation column at a head temperature of up to about 60° C.

(b) A mixture of hydrocarbons which consists essentially of non-aromatic hydrocarbons normally boiling between 60° C. and 150° C. and aromatic hydrocarbons normally boiling between 80° C. and 150° C.

(c) With hexafluoroisopropyl alcohol in a proportion of from about 1 to about 100 parts by weight for each part of the non-aromatic hydrocarbons to be separated from the mixture.

(d) Taking off at least one overhead fraction consisting essentially of a low-boiling azeotrope of hexafluoroisopropyl alcohol and at least one of said non-aromatic hydrocarbons and leaving a still residue containing most of said aromatic hydrocarbons, and (e) Separating from both the overhead fraction and the still residue the hexafluoroisopropyl alcohol contained therein.

This invention is based primarily upon the discovery that, when hydrocarbon mixtures of the above defined character are so distilled with hexafluoroisopropyl alcohol, the hexafluoroisopropyl alcohol forms low-boiling azeotropes (boiling between 40° C. and 60° C.) with the non-aromatic hydrocarbons which have normal boiling points between 60° C. and 150° C., but not with the aromatic hydrocarbons which contain more than 6 carbon atoms, whereby such azeotropes distill off from the mixture and can be taken off overhead, leaving a still residue containing all or most of the aromatic hydrocarbons in increased concentration. Different non-aromatic hydrocarbons of 6–8 carbon atoms form azeotropes having different boiling points and, when two or more of such non-aromatic hydrocarbons are present in the original hydrocarbon mixture, the azeotropic distillate can be taken off in two or more fractions containing the different non-aromatic hydrocarbons in differing proportions. While hexafluoroisopropyl alcohol forms an azeotrope with benzene, which azeotrope boils at about 58° C., the azeotropic distillates of the non-aromatic hydrocarbons, containing little or no benzene, are obtained even from mixtures or hydrocarbons containing relatively large amounts of benzene, since the azeotropes of the non-aromatic hydrocarbons generally are lower-boiling and distill off before the higher boiling benzene azeotrope.

Therefore, this invention provides a process whereby mixtures of hydrocarbons, which consist essentially of non-aromatic hydrocarbons normally boiling between 60° C. and 150° C. and aromatic hydrocarbons normally boiling between 80° C. and 150° C., can be separated into distillate fractions enriched in the non-aromatic hydrocarbons and residue fractions enriched in the aromatic hydrocarbons. By "normally boiling" is meant that the hydrocarbons boil at the indicated temperature under normal atmospheric pressure, i.e., at 760 mm., Hg. Usually, the non-aromatic hydrocarbon fractions will be free or substantially free of aromatic hydrocarbons. In general, the proportion of the non-aromatic hydrocarbons which are so separated from the starting hydrocarbon mixture may be controlled as desired by regulating the amounts of hexafluoroisopropyl alcohol, the extent to which the distillation is carried, and the other conditions. In some cases, such as where the non-aromatic hydrocarbons contain up to 8 carbon atoms and consist of saturated acylic and cyclic aliphatic hydrocarbons and olefines, complete separation of all of the non-aromatic hydrocarbons from the aromatic hydrocarbons can be readily accomplished.

Hexafluoroisopropyl alcohol is an unusually attractive azeotroping agent for use in the azeotropic distillation process. Its preparation and properties are described by W. J. Middleton in copending applications Serial No. 238,703, filed November 19, 1962 now Patent No. 3,227,674, and Serial No. 355,433, filed March 27, 1964. Hexafluoroisopropyl alcohol can be obtained by treatment of hexafluoroacetone with a reducing agent, such as lithium hydride or sodium borohydride, in a suitable solvent or by hydrogenation of hexafluoroacetone over a catalyst, such as platinum. The resulting alcohol, which has the structure $CF_3CH(OH)CF_3$ and can also be called hexafluoroisopropanol, 2-H-hexafluoro-2-propanol, hexafluoro-2-propanol, or 1,1,1,3,3,3-hexafluoro-2-propanol, is a water-white liquid which boils at 59° C. at 760 mm., melts at −1° C. and has a refractive index of below 1.3 at 20° C., a specific gravity of 1.59 grams per milliliter at 25° C., a calculated critical temperature of 182° C., and a latent heat of vaporization of about 90 B.t.u. per pound. It is miscible with water in all proportions at normal ambient temperatures and yet is easily separated from water by distillation. It has a high solvency for polar organic compounds, including olefinic hydrocarbons, and yet is easily separated from them. It is of low toxicity, with an approximate lethal concentration for rats of 3200 parts per million in air.

That hexafluoroisopropyl alcohol should form azeotropes with so many non-aromatic hydrocarbons normally boiling between about 60° C and about 150° C., but not form azeotropes with toluene and higher-boiling aromatic hydrocarbons would not be expected. The available techniques for predicting the formation of such azeotropes on the basis of molecular weight, vapor pressure, and other physical property data are not sensitive enough to forecast accurately the particular hydrocarbons which form azeotropes with an alcohol like hexafluoroisopropyl alcohol. Thus, it was quite unpredictable that hexafluoroisopropyl alcohol would form azeotropes with saturated acylic, saturated cycloaliphatic, and olefinic hydrocarbons of 6 to 8 carbon atoms, as would its forming with benzene an azeotrope which boils far enough above the boiling points of the other azeotropes to permit separation of non-aromatic hydrocarbons even from mixtures containing relatively large amounts of benzene.

Even less predictable would be the combination of solubility and distillation properties which makes possible the easy separation of hexafluoroisopropyl alcohol from most hydrocarbons with which it forms azeotropes by phase separation and/or water washing, and from other hydrocarbons by distillation. The azeotropes of hexafluoroisopropyl alcohol with saturated aliphatic hydrocarbons of 5–8 carbon atoms and the higher-boiling olefins, i.e., of more than 7 carbon atoms, form two phases upon condensation. The azeotropes with the lower-boiling olefins, i.e., of 5–7 carbon atoms, and with benzene remain a single phase at ordinary room temperatures. The hexafluoroisopropyl alcohol can be recovered from those azeotropes which form two phases by extracting with water, with or without first separating the phases. Hexafluoroisopropyl alcohol can also be removed from miscible mixtures of olefins and the alcohol by water extraction, but isolation of benzene from the benzene azeotrope requires more complex processes. Residual hexafluoroisopropyl alcohol can be removed from the non-azeotroping still residues by distillation at temperatures above its normal boiling point.

The process of this invention has several features which make it especially attractive. Costs of power for heating and cooling are low because of the relatively low heat of vaporization of the hexafluoroisopropyl alcohol and the relatively high proportion of hydrocarbons in the azeotropes formed. As an average, the azeotroping of one pound of hydrocarbon requires the distillation of only about nine pounds of the alcohol. Losses of hexafluoroisopropyl alcohol should be quite small in well engineered plants, since the alcohol is stable, unreactive, and non-corrosive and since it is easily separated by water washing from most of those hydrocarbons with which it forms azeotropes and by distillation from those hydrocarbons with which it does not form azeotropes. Hexafluoroisopropyl alcohol forms azeotropes with non-aromatic hydrocarbons boiling over a wide range of temperatures and having a range of structures. These hydrocarbons are straight-chain, branched-chain, or cyclic in structure and may be either saturated or olefinic. The olefinic hydrocarbons may have either terminal or internal double bonds.

Because of the variety of non-aromatic hydrocarbons which form azeotropes with hexafluoroisopropyl alcohol, it is practical to use the process of this invention with a wide range of hydrocarbon mixtures obtained from the refining of petroleum, the coking of coal, or from other chemical processes. Typical mixtures which can be separated by this process are aromatic reformates and catalytically cracked hydrocarbon mixtures from oil refineries, light aromatic distillates obtained from crude oils, the light oils obtained from the coking of coals, and aromatic light oils obtained as by-products of the cracking of gas oils and other higher-boiling materials to obtain ethylene, propylene, and other olefinic gases. The process is particularly adapted for the treatment of mixtures of petroleum hydrocarbons, such as gasolines, gasoline blending stocks, light naphthas and other petroleum products which are used in the manufacture of gasoline, e.g. aromatic reformates, depropanized aromatic reformates (aromatic reformates which have been distilled to remove propane and lighter hydrocarbons), cracked petroleum products, and the like.

The hydrocarbon mixtures to be treated should consist essentially of hydrocarbons normally boiling between 60° C. and 150° C. and include both non-aromatic hydrocarbons normally boiling between 60° C. and 150° C. and aromatic hydrocarbons normally boiling between 80° C. and 150° C. The hydrocarbon mixtures may contain small amounts (usually less than 5% by volume) of hydrocarbons normally boiling below 60° C. and/or small amounts (usually up to about 5%) of hydrocarbons boiling above 150° C., such mixtures being represented by the full boiling gasoline of Example 4, the depropanized aromatic reformate of Example 9, and the 115° C. to 145° C. fraction of a catalytically cracked gasoline of Example 6. Ordinarily, the hydrocarbon mixtures to be treated will be complex mixtures of a pluarlity of the non-aromatic hydrocarbons and a plurality of the aromatic hydrocarbons. The aromatic hydrocarbons normally boiling between 80° C. and 150° C. have 6 to 8 carbon atoms and are represented by benezene, toluene, the xylenes, and ethylbenzene. The non-aromatic hydrocarbons normally boiling between 60° C. and 150° C. ordinarily contain 6 to 8 carbon atmos and also ordinarily are saturated acyclic and cycloaliphatic hydrocarbons and olefines, of which n-hexane n-heptane, 1-heptene, 2-heptene, and methylcyclohexane are representative and usually constitute the predominant non-aromatic hydrocarbons.

The process of this invention can be used to separate hydrocarbon mixtures containing any relative proportions of non-aromatic hydrocarbons to aromatic hydrocarbons, and it has been successfully employed in the treatment of mixtures which consist essentially from about 2% to about 97% by volume of non-aromatic hydrocarbons normally boiling between 50° C. and 150° C. and from about 98% to about 3% by volume of aromatic hydrocarbons normally boiling between 80° C. and 150° C. The permissible relative proportions of non-aromatic to aromatic hydrocarbons in the mixture will be determined primarily by economic considerations and by the necessary or desired purity of the non-aromatic hydrocarbon fraction or of the aromatic hydrocarbon fraction. Usually, it will be desirable to treat mixtures which consist essentially of from about 2% to about 75% by volume of non-aromatic hydrocarbons normally boiling between 60° C. and 150° C. and from about 98% to about 25% by volume of aromatic hydrocarbons normally boiling between 80° C. and 150° C., and preferably mixtures containing from about 40% to about 70% by volume of said non-aromatic hydrocarbons and from about 60% to about 30% by volume of said aromatic hydrocarbons.

The amount of the hexafluoroisopropyl alcohol employed will depend primarily upon the amount of the non-aromatic hydrocarbons that are to be separated from the mixture. The hexafluoroisopropyl alcohol azeotropes of the non-aromatic hydrocarbons of 7 carbon atoms and of benezene contain about 90% by weight of hexafluoroisopropyl alcohol. The hexafluoroisopropyl alcohol azeotropes of the non-aromatic hydrocarbons of 6 carbon atoms are expected to contain about 50% to about 60% by weight of hexafluoroisopropyl alcohol; and the azeotropes of the non-aromatic hydrocarbons of 8 carbon atoms are expected to contain about 95% by weight of hexafluoroisopropyl alcohol. Thus, since some of the non-aromatic hydrocarbons of 6 carbon atoms form azeotropes with 50% by weight of hexafluoroisopropyl alcohol, a minimum of at least one part by weight of hexafluoroisopropyl alcohol will be required to separate such hydrocarbons from mixtures containing aromatics. In general, the hydrocarbon mixtures to be treated by the process of this invention usually will contain complex mixtures of non-aromatic hydrocarbons of 6, 7 and 8 carbon atoms of which at least 50% will be non-aromatic hydrocarbons of 7 carbon atoms. Accordingly, it will usually be necessary with such mixtures to employ a minimum of about 9 parts by weight of hexafluoroisopropyl alcohol for each part of non-aromatic hydrocarbon to be separated from the mixture. It is desirable to use a slight to moderate excess of the hexafluoroisopropyl alcohol. Therefore, from about 1 to about 30 parts of weight of hexafluoroisopropyl alcohol ordinarily will be used for each part of non-aromatic hydrocarbon to be separated from the mixture, and preferably from about 10 to about 20 parts. Much larger proportions of hexafluoroisopropyl alcohol, up to 100 or more parts per part of hydrocarbon to be separated from the mixture, can be used, but generally large excesses will be uneconomical because of the greater costs of separating the excess hexafluoroisopropyl alcohol from the hydrocarbon fractions.

The process of this invention will have the largest advantage over competing processes, such as liquid extraction processes, in the separation of non-aromatic hydrocarbons from aromatic hydrocarbons in mixtures containing the higher proportions of aromatic hydrocarbons. Most solvent extraction processes for such separations require considerably larger amounts of solvent and/or larger equipment when operated with mixtures that are quite high in aromatic hydrocarbons. Such advantages of the process of this invention will be particularly apparent in separating non-aromatic hydrocarbons from highly aromatic petroleum reformates and from light oils obtained from the coking of coal.

The process of this invention can be operated so as to separate mixtures of the non-aromatic hydrocarbons into a plurality of fractions enriched in different non-aromatic hydrocarbons by taking off distillates at different head temperatures, by separation of the phases obtained on condensation and cooling of the distillates, or by a combination of both of those procedures. The phases, formed on condensation and cooling of a distillate, contain different non-aromatic hydrocarbons in different proportions, whereby separation of the two phases and separately washing each with water yields two fractions, one enriched in the hydrocarbons that are most soluble in the alcohol and the other enriched in the less soluble hydrocarbons.

The process of this invention is simple and easy to carry out. It employs conventional procedures and equipment known to the art for azeotropic distillations. It may be carried out batch-wise by simply mixing the mixture of hydrocarbons to be treated with the desired amount of hexafluoroisopropyl alcohols, and distilling such mixture in a distillation column at head temperatures of up to about 60° C. at substantially atmospheric pressure. Usually, the head temperatures will vary from about 45° C. to about 59° C. Where the hydrocarbon mixture contains lighter or more volatile hydrocarbons, as in a full boiling range gasoline, lower lead temperatures may be used at the start so as to first distill off such lighter hydrocarbons. In practice, the process usually will be carried out in a continuous manner by mixing streams of the hydrocarbon mixture and the hexafluoroisopropyl alcohol in the desired proportion and continuously feeding such mixture into a distillation column, or by continuously feeding the separate streams directly into such distillation column, and continuously taking off the distillate fractions overhead and the still residue fractions from the bottom of the distillation column. In many cases, the desired degree of separation of the non-aromatic hydrocarbons from the aromatic hydrocarbons will not be obtained in a single pass through the distillation column. In such cases, more complete separation can be accomplished by repeated azeotropic distillations or specific fractions, particularly of the still residue.

In a representative continuous process, a hydrocarbon mixture, boiling between about 60° C. and about 150° C. and containing both non-aromatic and aromatic hydrocarbons, will be fed to a distillation column along with a stream of hexafluoroisopropyl alcohol. The low-boiling azeotropes of the hexafluoroisopropyl alcohol will go overhead and leave as a residue an aromatic concentrate comprising hydrocarbons not azeotroping with the alcohol. The overhead stream will be condensed, cooled, and washed with water. The water washing removes the alcohol from the hydrocarbons. The water, containing the dissolved hexafluoroisopropyl alcohol, will be distilled, the alcohol going overhead and then being recycled to the azeotropic distillation step, and the water (freed of alcohol) being recycled to the washing step. The overhead stream from the azeotropic distillation tends to form two phases, an alcohol-rich phase and a hydrocarbon-rich phase, and such phases can be separated and each subjected to water washing. Any residual hexafluoroisopropyl alcohol in the residue from the azeotropic distillation can be removed by distillation to obtain an alcohol-free aromatic concentrate, and liquid hexafluoroisopropyl alcohol which will be recycled to the azeotropic distillation step.

In an alternative embodiment of the continuous process, a feed, containing saturated acyclic, olefinic, naphthenic, and aromatic hydrocarbons boiling between 60° C. and 150° C., will be fed to a distillation column along with a recycle stream composed of hexafluoroisopropyl alcohol and dissolved hydrocarbons, to obtain an overhead stream containing azeotropes of hexafluoroisopropyl alcohol and a bottoms stream containing hydrocarbons, mostly aromatic, not azeotroping with the alcohol. The distillation column overhead stream will be cooled to obtain a two-phase stream which is separated into an alcohol-rich stream which will be recycled to the azeotropic distillation, and a hydrocarbon-rich stream which will be distilled in a second distillation column to obtain a second azeotrope stream which also will be recycled to the azeotropic distillation, and an alcohol-free mixture of non-aromatic hydrocarbons. Alternatively, the second azeotropic distillation can be omitted and the hydrocarbon-rich bottoms stream from the first azeotropic distillation can be water-washed.

The apparatus and techniques for carrying out such continuous processes with other azeotroping agents are well known to the art and are described by K. H. Eisenlohr in his paper and by others in U.S. Patents 2,356,240; 2,602,093; 2,692,227; and 2,684,935, hereinbefore referred to. Such apparatus and techniques are suitable for use on operating the process of this invention.

In order to more clearly illustrate this invention and the advantageous results to be obtained thereby, the following examples are given in which the parts and proportions are by weight except where specifically indicated otherwise.

Example 1

A homogeneous mixture of n-heptane, 1-heptene, 2-heptene, toluene, other unidentified hydrocarbons which probably were olefinic hydrocarbons of 7 carbon atoms, and hexafluoroisopropyl alcohol was distilled through a spinning band column about 1.2 cm. inside diameter and 72 cm. long. Table I shows the fractions obtained at various head temperatures (to the nearest 0.5° C.) and their analysis as determined by vapor phase chromatography, including two successive fractions C and D obtained at about 58.5° C.

TABLE I

| Fraction | A | | B | C | D | E |
|---|---|---|---|---|---|---|
| Temperature, ° C. | [1] 56 | | 56.5 | 58.5 | 58.5 | [2] 58.5 |
| Percent of total | 25.1 | | 12.1 | 13.2 | 34.7 | 13.9 |
| | Upper layer | Lower layer | | | | |
| Composition, weight percent: | | | | | | |
| Hexafluoroisopropyl alcohol | 0.5 | 89.1 | 83.3 | 96.2 | 99.6 | 85.6 |
| n-Heptane | 65.4 | 4.5 | 0.6 | | | |
| 1-Heptene | 27.9 | 5.0 | 14.4 | 2.2 | 0.3 | 0.3 |
| 2-Heptene | | 0.5 | 1.7 | 1.6 | | |
| Toluene | | | | | | 10.8 |
| Other hydrocarbons | 6.2 | 0.9 | | | | 1.4 |

[1] Below.
[2] Above.

Fraction A boiled significantly below the normal boiling point of the alcohol and separated into two layers on cooling to 25° C. The upper layer contained large amounts of n-heptane and 1-heptene and the lower layer contained smaller amounts of these hydrocarbons along with hexafluoroisopropyl alcohol. Fractions B and C contained significant amounts of 1-heptene and 2-heptene. Fraction E, the still residue, contained a significant amount of toluene and was essentially free of n-heptane, 1-heptene, and 2-heptene.

These results indicate clearly that hexafluoroisopropyl alcohol forms low-boiling azeotropes with n-heptane, 1-heptene, and 2-heptene, but not with toluene.

Example 2

The compositions and boiling points of azeotropes formed by hexafluoroisopropyl alcohol (HFIP) and representative hydrocarbons were determined by refluxing mixtures of the alcohol with various hydrocarbons in a spinning band column of approximately 12 theoretical plates for an hour or more, removing a sample of the condensed vapor, and analyzing the sample by vapor phase chromatography. The data obtained are shown in Table II.

TABLE II

| Hydrocarbon | | Azeotrope | |
|---|---|---|---|
| Name | Boiling Point, ° C. | Boiling Point, ° C. | Weight Percent HFIP |
| 2-methyl pentane | 60.3 | 41.9 | 63 |
| n-Hexane | 69.0 | 47 | 70 |
| n-Heptane | 98.5 | 54 | 90.3 |
| 1-heptane | 94.5 | 56 | 90.6 |
| 2-heptene | 98.1 | [1] 55 | |
| Methylcyclohexane | 100.3 | 54.5 | 87.2 |
| Benzene | 80.1 | [1] 58 | 89 |

This example demonstrates the formation and composition of azeotropes of hexafluoroisopropyl alcohol with paraffinic, olefinic, and naphthenic hydrocarbons and with benzene.

Example 3

An Othmer-type equilibrium still was used to determine vapor-liquid equilibrium data for various mixtures of benzene and hexafluoroisopropyl alcohol and of toluene with the alcohol. The data from the benzene mixtures showed the formation of an azeotrope containing the alcohol at a mole fraction of approximately 0.8. Data from the toluene mixtures showed the absence of any azeotrope.

Example 4

A mixture was prepared of 30 ml. of hexafluoroisopropyl alcohol and 15 ml. of a full boiling range gasoline (composed of reformate and catalytic cracked stocks) which contained, by volume, 48% saturates, 17.5% olefins and 34.5% aromatics by the fluorescent indicator absorption procedure of ASTM Method D-1319-61T. This gasoline had a boiling range of about 40° C. to about 180° C. and consisted essentially of hydrocarbons boiling between 60° and 150° C., most of which contained 6-8 carbon atoms. This mixture was distilled through the spinning band column of Example 1 until the column lost reflux at a head temperature of 58.5° C. There were obtained an overhead distillate fraction of 33 ml. and a residue of 10 ml. The distillate fraction (which separated into two layers) was washed with water twice to obtain 5.8 ml. of a hydrocarbon layer which analyzed, by volume, 72% saturates, 28% olefins, and trace aromatic. The residue was also washed with water to obtain 6.9 ml. of hydrocarbons which analyzed, by volume, 11.5% saturates, 15.5% olefins and 73% aromatics. The water extracts were combined to obtain extracts were combined to obtain 134 ml. of a mixture containing 65.4% by weight of water. One hundred milliliters of this water mixture was distilled to obtain 25.5 ml. of water-free hexafluoroisopropyl alcohol.

This example shows the separation of a non-aromatic fraction from a practical hydrocarbon mixture by azeotropic distillation, and the recovery of the solvent by water washing and distillation. There was insufficient hexafluoroisopropyl alcohol in the starting mixture to form azeotropes with all the saturated and olefinic hydrocarbons present in the gasoline, on the basis that typical azeotropes contain about 90% by weight of the alcohol as indicated in Example 2.

Example 5

The gasoline of Example 4 was separated into four fractions by distillation through a helix-packed column. From 93.6 grams there was obtained (I) 37 ml. boiling below 95° C.; (II) 24 ml. boiling between 95° C. and 115° C.; (III) 24 ml. boiling between 115° C. and 145° C.; and (IV) still residue. A mixture of 5.2 ml. of fraction II and 48 ml. of hexafluoroisopropyl alcohol was distilled through a spinning band column to a head temperature of 60° C. to obtain 46.5 ml. of distillate and 5.4 ml. of still residue. The distillate and the residue were washed with water to obtain a washed distillate and a washed residue in the volume ratio of 55:45. The analyses of fraction II, the washed distillate, and the washed residue, obtained by the fluorescent indicator absorption procedure of ASTM Method D-1319-61T, are shown in Table III. Essentially all the saturated and olefinic components of the starting mixture were azeotropically distilled to obtain an aromatic-free distillate and a substantially pure aromatic residue.

TABLE III

|  | Fraction II, percent | Washed Distillate, percent | Washed Residue, percent |
| --- | --- | --- | --- |
| Saturates | 54 | 79 | 0 |
| Olefins | 13 | 21 | 0.5 |
| Aromatics | 33 | 0 | 99.5 |

This example shows the separation of a practical hydrocarbon mixture of the boiling range of toluene but above the boiling range of benzene into aromatic and non-aromatic fractions.

Example 6

A mixture of 15 ml. of fraction III from Example 5 and 30 ml. of hexafluoroisopropyl alcohol was distilled through a spinning-band column to a head temperature of 60° C. to obtain 31.5 ml. of distillate and 12.0 ml. of residue. The distillate and residue were washed with water to obtain a washed distillate and a washed residue in the volume ratio of 20:80. The analyses of fraction III, the washed distillate, and the washed residue are given in Table IV. The distillate was essentially free of aromatic components. There was not enough hexafluoroisopropyl alcohol present to azeotrope all the non-aromatic hydrocarbons in the starting mixture, on the basis that typical azeotropes contain about 90% by weight of the alcohol as indicated in Example 2.

TABLE IV

|  | Fraction III, percent | Washed Distillate, percent | Washed Residue, percent |
| --- | --- | --- | --- |
| Saturates | 23 | 81 | 6.5 |
| Olefins | 16 | 19 | 15.0 |
| Aromatics | 61 | 0 | 78.5 |

This example shows the separation of an aromatic-free distillate from a practical hydrocarbon mixture of the boiling range of the xylene isomers and ethyl benzene.

Example 7

A mixture of 10 ml. of fraction I from Example 5, 5 ml. of benzene, and 30 ml. of hexafluoroisopropyl alcohol was distilled through a spinning band column to a head temperature of 60° C. and the distillate and residue were washed with water. The analyses of the starting mixture, the washed distillate, and the washed residue are shown in Table V.

TABLE V

|  | Starting Mixture, percent | Washed Distillate, percent | Washed Residue, percent |
| --- | --- | --- | --- |
| Saturates | 44 | 56 | 0 |
| Olefins | 21.5 | 37 | 2 |
| Aromatics | 34.5 | 7 | 98 |

This example shows that, even though an azeotrope is formed between benzene and the solvent, there was obtained an almost complete separation of the saturated and olefinic hydrocarbons from the benzene by azeotropic distillation.

Example 8

Other samples of the gasoline of Example 4 were distilled through the spinning band column to obtain fractions boiling below 115° C. and below 145° C. Mixtures of 15 ml. of each of these fractions and 30 ml. of hexafluoroisopropyl alcohol were distilled as described in Examples 5, 6 and 7. The analyses of the fractions, the washed distillates, and the washed residues are shown in Table VI.

TABLE VI

|  | Fraction, percent | Washed Distillate, percent | Washed Residue, percent |
| --- | --- | --- | --- |
| For the fraction boiling below 115° C.: |  |  |  |
| Saturates | 64 | 70.5 | 0 |
| Olefins | 22.5 | 29 | 7.5 |
| Aromatics | 13.5 | 0.5 | 92.5 |
| For the fraction boiling below 145° C.: |  |  |  |
| Saturates | 49.5 | 71 | 3.5 |
| Olefins | 21 | 28.5 | 10 |
| Aromatics | 29.5 | 0.5 | 86.5 |

This example shows the separation of essentially aromatic-free azeotropic distillates from wider-boiling hydrocarbon mixtures to leave residues greatly enriched in aromatic hydrocarbons.

*Example 9*

A depropanized reformate was distilled with hexafluoroisopropyl alcohol as described in Examples 5, 6 and 7. The analyses of the depropanized reformate, the washed distillate, and the washed residue are shown in Table VII. The distillation gave an almost aromatic-free distillate. Failure to obtain a completely aromatic residue was at least partly due to the use of an inadequate amount of hexafluoroisopropyl alcohol, but may also have been due to the lack of azeotropes between some high molecular weight non-aromatic components of the reformate and the solvent.

TABLE VII

|  | Depropanized Reformate, Percent | Washed Distillate, Percent | Washed Residue, Percent |
|---|---|---|---|
| Saturates | 57 | 97 | 16.5 |
| Olefins | 1 | 2 | 1.5 |
| Aromatics | 42 | 1 | 82 |

This example shows the azeotropic distillation of an almost olefin-free mixture of hydrocarbons to obtain a distillate of greatly reduced aromatic content and a residue of greatly increased aromatic content.

*Example 10*

A mixture of 40 ml. of coke oven aromatics, analyzing 67.8% benzene, 20.1% toluene, 10.2% xylenes and ethylbenzene, and 1.9% other hydrocarbons (mainly non-aromatic hydrocarbons of 6–8 carbon atoms) by vapor phase chromatography, was distilled with 10 ml. hexafluoroisopropyl alcohol (HFIP) in a spinning band column. A comparison of the results of this distillation with a simple fractionation of the same mixture in the same column but without added hexafluoroisopropyl alcohol is shown in Table VIII. The azeotropic distillation noticeably reduced the amount of other hydrocarbons in the benzene (60° C. to 81° C.) and toluene (110° to 112° C.) fractions.

TABLE VIII

| Fraction | Boiling Range ° C. | Composition by Vapor Phase Chromatography | | | | |
|---|---|---|---|---|---|---|
|  |  | HFIP | Benzene | Toluene | Xylenes | Other |
| From the azeotropic distillation: |  |  |  |  |  |  |
| 1 | Below 60 | 92.5 | 5.8 |  |  | 1.7 |
| 2 | 60 to 79 | 20.9 | 77.2 |  |  | 1.9 |
| 3 | 79 to 81 | .5 | 99.2 |  |  | 0.3 |
| 4 | 81 to 110 |  | 23.5 | 73.5 |  | 3.0 |
| 5 | 110 to 111 |  | 1.4 | 97.6 |  | 1.0 |
| Residue | Above 111 |  | 0.2 | 12.4 | 72.3 | 5.1 |
| From the simple fractionation: |  |  |  |  |  |  |
| 1 | 77 to 81 |  | 98.4 |  |  | 1.6 |
| 2 | 81 to 110 |  | 40.8 | 54.5 |  | 4.7 |
| 3 | 110 to 112 |  | 1.9 | 96.6 |  | 1.5 |
| Residue | Above 112 |  |  | 14.3 | 70.4 | 15.3 |

This distillation shows the application of azeotropic distillation to a hydrocarbon mixture not derived from petroleum and also the recovery of benzene in high purity in spite of the formation of an azeotrope between the hexafluoroisopropyl alcohol and benzene. The presence of significant amounts of other hydrocarbons in all fractions indicates that the alcohol fails to form azeotropes with all non-aromatic hydrocarbons boiling in the range of this mixture.

It will be understood that the foregoing examples have been given for illustrative purposes solely and that this invention is not restricted to the specific embodiments described therein. On the other hand, it will be readily apparent to those skilled in the art that, subject to the limitations set forth in the general description, many variations and modifications can be made in the compositions of the hydrocarbon mixtures to be treated, the proportions of hexafluoroisopropyl alcohol to hydrocarbons, the conditions, the equipment, and the techniques employed, without departing from the spirit or scope of this invention.

From the foregoing description, it will be apparent that this invention provides a new and improved process for separating non-aromatic hydrocarbons from their mixtures with aromatic hydrocarbons by azeotropic dissolution, employing a novel azeotroping agent which has a new combination of valuable properties whereby efficient and effective separations can be readily accomplished. The process is easy, simple and economical to operate, and employs conventional equipment and techniques. Therefore, it will be apparent that this invention constitutes a valuable contribution to and advance in the art.

The embodiments of the invention in which an exclusive property or privilege is claimed are defined as follows:

1. The process for separating non-aromatic hydrocarbons from a mixture thereof with aromatic hydrocarbons, which process comprises
   (a) distilling in a distillation column at a head temperature of up to about 60° C.,
   (b) a mixture of hydrocarbons which consists essentially of non-aromatic hydrocarbons normally boiling between 60° C. and 150° C. and aromatic hydrocarbons normally boiling between 80° C. and 150° C.,
   (c) with hexafluoroisopropyl alcohol in a proportion of from about 1 to about 100 parts by weight for each part of the non-aromatic hydrocarbons to be separated from the mixture,
   (d) taking off at least one overhead fraction consisting essentially of a low-boiling azeotrope of hexafluoroisopropyl alcohol and at least one of said non-aromatic hydrocarbons and leaving a still residue containing most of said aromatic hydrocarbons,
   (e) and separating from both the overhead fraction and the still residue the hexafluoroisopropyl alcohol contained therein.

2. The process for separating non-aromatic hydrocarbons from a mixture thereof with aromatic hydrocarbons, which process comprises
   (a) distilling in a distillation column at a head temperature of up to about 60° C.,
   (b) a mixture of hydrocarbons which consists essentially of from about 2% to about 97% by volume of non-aromatic hydrocarbons normally boiling between 60° C. and 150° C. and from about 98% to about 3% by volume of aromatic hydrocarbons normally boiling between 80° C. and 150° C.,
   (c) with hexafluoroisopropyl alcohol in a proportion of from about 1 to about 30 parts by weight for each part of the non-aromatic hydrocarbons to be separated from the mixture,
   (d) taking off at least one overhead fraction consisting essentially of a low-boiling azeotrope of hexafluoroisopropyl alcohol and at least one of said non-aromatic hydrocarbons and leaving a still residue containing most of said aromatic hydrocarbons,
(e) and separating from both the overhead fraction and the still residue the hexafluoroisopropyl alcohol contained therein.

3. The process for separating non-aromatic hydrocarbons from a mixture thereof with aromatic hydrocarbons, which process comprises
   (a) distilling in a distillation column at a head temperature of up to about 60° C.
   (b) a mixture of hydrocarbons which consists essentially of from about 2% to about 75% by volume of non-aromatic hydrocarbons normally boiling between 60° C. and 150° C. and from about 98% to about 25% by volume of aromatic hydrocarbons normally boiling between 80° C. and 150° C.
   (c) with hexafluoroisopropyl alcohol in a proportion of from about 1 to about 30 parts by weight for each part of the non-aromatic hydrocarbons to be separated from the mixture,
   (d) taking off at least one overhead fraction consisting essentially of a low-boiling azeotrope of hexafluoroisopropyl alcohol and at least one of said non-aromatic hydrocarbons and leaving a still residue containing most of said aromatic hydrocarbons,
   (e) and separating from both the overhead fraction and the still residue the hexafluoroisopropyl alcohol contained therein.

4. The process for separating non-aromatic hydrocarbons from a mixture thereof with aromatic hydrocarbons, which process comprises
   (a) distilling in a distillation column at a head temperature of up to about 60° C.
   (b) a mixture of petroleum hydrocarbons which consists essentially of from about 2% to about 97% by volume of a mixture of non-aromatic hydrocarbons normally boiling between 60° C. and 150° C. and from about 98% to about 3% by volume of a mixture of aromatic hydrocarbons normally boiling between 80° C. and 150° C.
   (c) with hexafluoroisopropyl alcohol in a proportion of from about 10 to about 20 parts by weight for each part of the non-aromatic hydrocarbons to be separated from the mixture,
   (d) taking off an overhead fraction consisting essentially of low-boiling azeotropes of hexafluoroisopropyl alcohol and said non-aromatic hydrocarbons and leaving a still residue containing most of said aromatic hydrocarbons,
   (e) and separating from both the overhead fraction and the still residue the hexafluoroisopropyl alcohol contained therein.

5. The process for separating non-aromatic hydrocarbons from a mixture thereof with aromatic hydrocarbons, which process comprises
   (a) distilling in a distillation column at a head temperature of up to about 60° C.
   (b) a mixture of petroleum hydrocarbons which consists essentially of from about 2% to about 75% by volume of a mixture of non-aromatic hydrocarbons normally boiling between 60° C. and 150° C. and from about 98% to about 25% by volume of a mixture of aromatic hydrocarbons normally boiling between 80° C. and 150° C.
   (c) with hexafluoroisopropyl alcohol in a proportion of from about 10 to about 20 parts by weight for each part of the non-aromatic hydrocarbons to be separated from the mixture,
   (d) taking off an overhead fraction consisting essentially of low-boiling azeotropes of hexafluoroisopropyl alcohol and said non-aromatic hydrocarbons and leaving a still residue containing most of said aromatic hydrocarbons,
   (e) and separating from both the overhead fraction and the still residue the hexafluoroisopropyl alcohol contained therein.

6. The process for separating non-aromatic hydrocarbons from a mixture thereof with aromatic hydrocarbons, which process comprises
   (a) distilling in a distillation column at a head temperature of up to about 60° C.
   (b) a mixture of petroleum hydrocarbons which consists essentially of from about 40% to about 70% by volume of a mixture of non-aromatic hydrocarbons normally boiling between 90° C. and 150° C. and from about 60% to about 30% by volume of a mixture of aromatic hydrocarbons normally boiling between 90° C. and 150° C.
   (c) with hexafluoroisopropyl alcohol in a proportion of from about 10 to about 20 parts by weight for each part of the non-aromatic hydrocarbons to be separated from the mixture,
   (d) taking off an overhead fraction consisting essentially of low-boiling azeotropes of hexafluoroisopropyl alcohol and said non-aromatic hydrocarbons and leaving a still residue containing most of said aromatic hydrocarbons,
   (e) and separating from both the overhead fraction and the still residue the hexafluoroisopropyl alcohol contained therein.

No references cited.

DELBERT E. GANTZ, *Primary Examiner.*

H. LEVINE, *Assistant Examiner.*